May 24, 1927.

H. R. PIERCE

GAS GRAVITY BALANCE

Filed Feb. 19, 1926

Inventor:
HOMER ROLAND PIERCE,
By John H. Bruninga
His Attorney.

Patented May 24, 1927.

1,629,526

UNITED STATES PATENT OFFICE.

HOMER ROLAND PIERCE, OF BARTLESVILLE, OKLAHOMA, ASSIGNOR TO INDIAN TERRITORY ILLUMINATING OIL COMPANY, OF BARTLESVILLE, OKLAHOMA, A CORPORATION OF NEW JERSEY.

GAS GRAVITY BALANCE.

Application filed February 19, 1926. Serial No. 89,340.

This invention pertains to apparatus for determining the specific gravity of gases and ordinarily known by the name of specific gravity balance.

The determination of the specific gravity of a gas by the specific gravity balance method is usually carried out in the laboratory and the apparatus ordinarily employed for such determination must be of very delicate construction in order that a requisite degree of precision can be attained in the measurements involved. It is desirable, however, to have available apparatus for taking these measurements in the field. As the laboratory apparatus is of too delicate a construction to permit portability, it is desirable to provide an instrument of robust construction having provisions adapted to insure safe carriage thereof so that it may be carried about for field tests.

One of the objects of this invention, therefore, is to provide an apparatus for testing the specific gravity of gases in the field, and which is construced so as to be readily portable without damage thereto.

A further object of this invention is to provide such an apparatus which, though portable, is yet capable of sufficiently accurate measurements so that a reliable determination may be made thereby.

Further objects will appear from the following description taken in connection with the accompanying drawings, in which.

Figure 1:
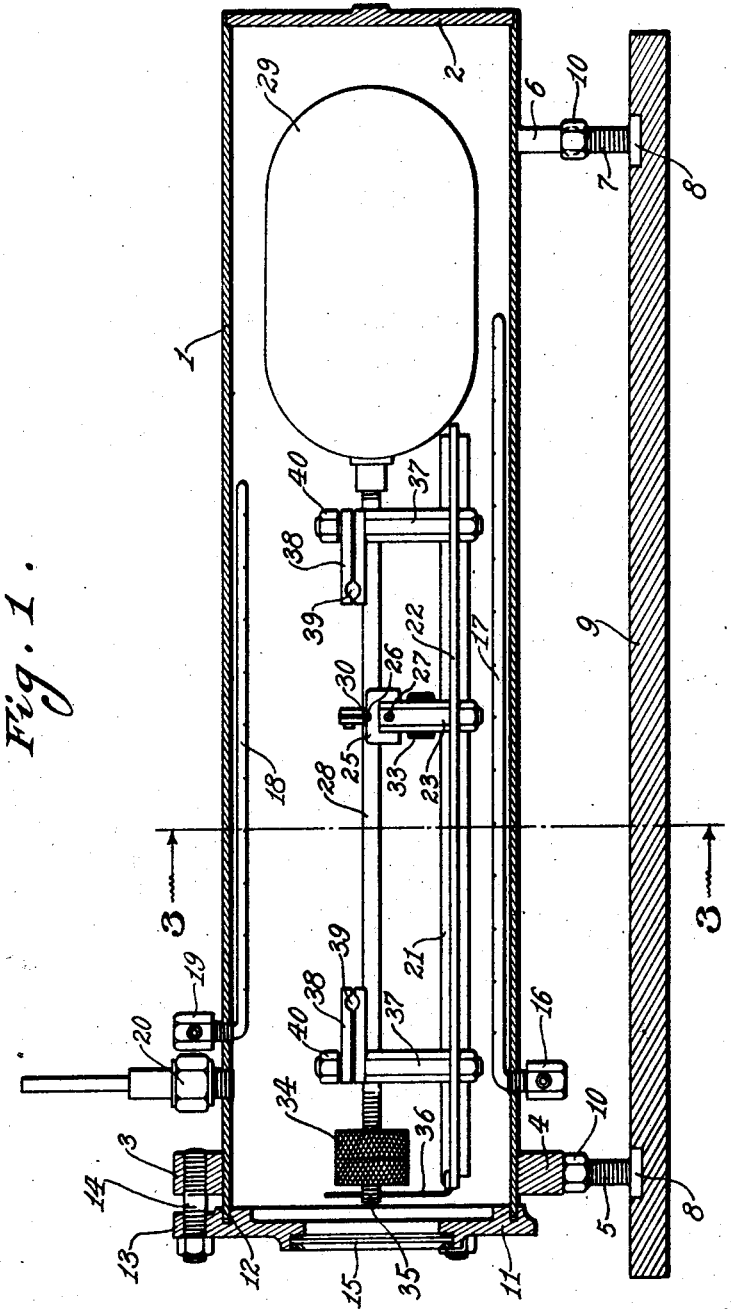
Figure 1 is a longitudinal section of an apparatus embodying this invention.
Figure 2:
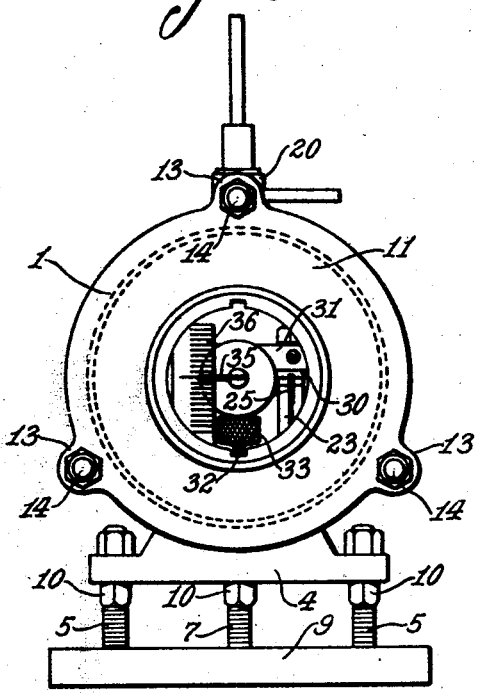
Figure 2 is a left-hand end view of Figure 1.
Figure 3:
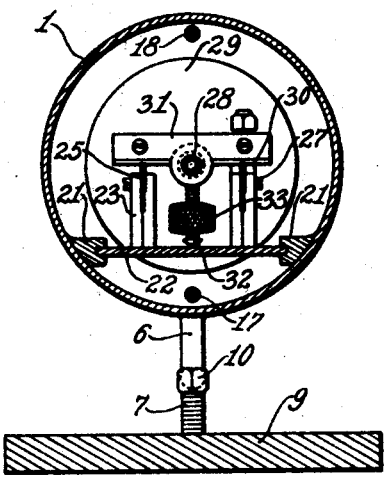
Figure 3 is a section on line 3—3 of Figure 1.
Figure 4:
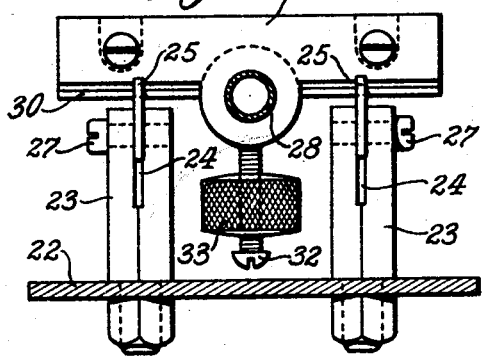
Figure 4 is an enlarged detail of Figure 3 showing the pivot bearing.
Figure 5:
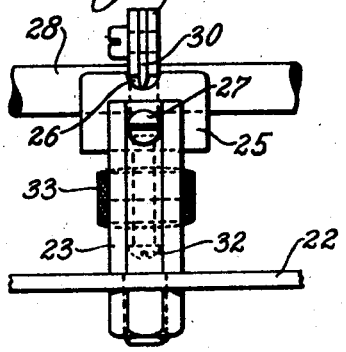
Figure 5 is a side view of Figure 4.

Referring to the accompanying drawings, 1 designates a gas container. This is preferably constructed of drawn metal tubing so as to form a strong container and one which is not liable to be porous so as to absorb gas or allow the same to leak therethrough. This tube is closed at its rear end by a plate 2 brazed or soldered in place to form a gas-tight joint. The tube 1 has fixed thereto by soldering or otherwise, at its front end, a ring 3 of metal provided with a foot 4 adapted to receive a pair of leveling screws 5. Fixed to the rear end of the container 1 is a bracket 6 adapted to receive a leveling screw 7. The leveling screws 5 and 7 are fixed to plates 8 mounted in a wooden base 9. The leveling screws are also provided with nuts 10 upon which the container rests and which may be manipulated in order to level the same.

An end cap 11 is provided with a groove 12 adapted to receive the end of the tube 1 and in which suitable packing may be placed. A series of lugs 13 on the end cap are adapted to receive clamping screws 14 fixed in corresponding lugs on the ring 3 in order to clamp the cap securely on the container with a gas-tight connection. The central part of the cap 11 is provided with an aperture closed by a transparent window 15. The window 15 is also suitably clamped or cemented in place so as to be gas-tight.

A connection 16 adapted to make connection with any suitable source of gas supply is fixed to the container and communicates with an inlet tube 17 extending along the interior of the container 1 and perforated with small holes along its length as indicated in Figure 1 so as to permit the gas to escape therefrom into the container, this tube being closed at its far end. A similar outlet tube 18 connects with a connection 19 to provide for exhausting the gas from the container. A third connection 20 provides for connection to a suitable pressure gauge.

The extension of the inlet tube 17 and the outlet tube 18 along the length of the interior of the container and the provision of perforations through the length of each tube permits a quick even flow of gas throughout all parts of the container. In this manner there will be no difference in pressures between the gas at one end of the container and the other and the container may be evenly and expeditiously filled or exhausted.

Mounted within the container 1 and fixed thereto is a pair of guides or slides 21 adapted to receive a supporting plate 22. The support 22 is removably mounted in the container 1 by means of the guides 21. When the end cap 11 has been removed, this support may be slid out of or into the container.

Mounted on the support 22 is a pair of posts 23 split longitudinally as shown at 24 to receive adjustably therein a pair of knife edge bearings 25. These bearings consist of small plates of hardened tool steel provided with semi-circular grooves or notches 26 in their upper edges. The bearings 25 are clamped in their posts 23 by clamping screws 27, some clearance being allowed about the screws 27 to permit adjustment of the bearings.

A balancing beam is provided, comprising a rod or tube 28, having mounted at one end thereof a sealed bulb 29. The latter may be constructed of spun sheet metal or the like and is adapted to provide a displacement float. Mounted intermediate the length of the beam is a knife edge 30 extending crosswise thereof and adapted to rest in the notches 26 of the bearings 25. The knife edge 30 is also constructed of a plate of hardened tool steel and ground to a keen knife edge at its lower edge and clamped in a bracket 31 fixed to the beam 28. The knife edge 30 is adjustable on the bracket 31 so as to provide for raising and lowering the knife edge with respect to the beam. Also mounted on the bracket 31 is a screw 32 on which is threaded a balancing weight 33. Mounted on the end of the beam 28, which is threaded for that purpose, is a counter weight 34. This is adjustable along the beam so as to counter-balance the float 29. The end of the beam 28 carries an index 35 adapted to move over a scale 36, mounted on the support 22.

The support 22 also has mounted thereon a pair of posts 37. One of these posts is mounted adjacent each end of the support and each post is provided with a holder or clamp 38 having a socket 39 adapted to receive the beam 28. Figure 1 shows these clamps turned aside so as not to interfere with the normal operation of the balance. When the balancing beam is removed from the container, the clamps 28 may be swung inwardly and the beam mounted therein. The same may be securely clamped therein by the nuts 40. In this position the beam will be rigidly held by these clamps clear of the bearings 25.

In the use of this device, the balancing beam is pivotally mounted with the knife edge 30 resting in the notches 26. The float 29 has previously been filled with dry air or other standard gas at a predetermined pressure. The beam is accurately balanced by means of the counterweight 34. With the balancing beam in place in the container and the cap 11 securely clamped thereon, a pressure gauge is attached at 20 and the gas to be measured is passed into the container by the tube 17, the tube 18 being sealed so as to prevent exit of the gas. The balance of the beam depends upon the buoyancy of the float 29, and this buoyancy depends upon the specific gravity and the pressure of the gas in which it floats. Accordingly, the beam can be balanced by adjusting the gas pressure in the container to the proper value. This is done by controlling the supply of gas to the container or the exit thereof from the container. When the proper balance has been obtained, the same may be noted by observing the movement of the index 35 over the scale 36. Such balance having been obtained and the appropriate readings of gas pressure taken, the gas is exhausted from the container and a standard gas such as air is passed into the container in place thereof. When the container has been completely purged of the previous gas and filled with the standard gas, the pressure is again adjusted to obtain a balance of the beam and a reading of such pressure is taken. The specific gravity of the gas in question is then determined by appropriate calculations, the pressure required to balance the beam being inversely proportional to the specific gravity of the gas.

It will be seen, therefore, that this invention provides an accurate testing device which at the same time is readily portable. The metal gas container is robust in construction and will stand fairly rough handling. The balancing beam is so constructed that an accurate and delicate balance can be obtained. When transporting the device the balancing beam and its support may be removed from the container, the beam mounted in the clamping holders 38 which are adapted to support the same rigidly and clear of the bearings 25 so that no damage to such bearings is liable during transportation. The support, having been removed from the container, may then be packed in a suitable carrying case, the container being packed separately, and the entire device transported conveniently and without danger of injury.

It is obvious that various changes may be made in the details of construction without departing from the spirit of this invention; it is to be understood, therefore, that this invention is not limited to the specific details shown and described.

Having thus described the invention, what is claimed is:

1. A portable specific gravity balance for gases comprising a gas container, a balancing beam having a displacement float, a pivotal support for said beam, and means independent of said support fixed interiorly of the container for removably mounting said support therein.

2. A portable specific gravity balance for gases, comprising, a gas container, a balancing beam having a displacement float, a pivotal support for said beam, and means in said container and fixed thereto for removably mounting said support therein.

3. A portable specific gravity balance for gases, comprising, a gas container, a balancing beam having a displacement float, a pivotal support for said beam, and a guide in said container and adapted to receive said support.

4. A portable specific gravity balance for gases, comprising a gas container, a balancing beam having a displacement float, a support, bearings for said beam, and means adjustably mounting said bearings on said support, and an adjustable pivot on said beam adapted to engage said bearings.

5. A portable specific gravity balance for gases, comprising a gas container, a balancing beam having a displacement float, a support, bearings for said beam, means adjustably mounting said bearings on said support, and an adjustable pivot on said beams adapted to engage said bearings, and means in said container for removably mounting said support therein.

6. A portable specific gravity balance for gases, comprising a gas container, a balancing beam having a displacement float, a support, bearings for said beam, means adjustably mounting said bearings on said support, and an adjustable pivot on said beam adapted to engage said bearings, and a guide fixed in said container and adapted to receive said support.

7. A portable specific gravity balance for gases, comprising, a gas container, a balancing beam having a displacement float, a support, means for pivotally supporting said beam on said support, means for rigidly supporting said beam on said support, and means for removably mounting said support in said container.

8. A portable specific gravity balance for gases, comprising, a gas container, a balancing beam having a displacement float, a support, means for pivotally supporting said beam on said support, means for rigidly supporting said beam on said support, and a slide in said container adapted to removably receive said support.

9. A portable specific gravity balance for gases, comprising, a gas container, a balancing beam having a displacement float, a support, means for pivotally supporting said beam on said support, means for rigidly supporting said beam on said support, knife-edge pivot means for said beam on said support, a rigid clamp for said beam on said support, and a slide in said container adapted to removably receive said support.

10. A portable specific gravity balance for gases, comprising, a gas container, a balancing beam having a displacement float, a pivotal support for said beam, and a slide in said container adapted to removably receive said support.

11. A portable specific gravity balance for gases, comprising, a gas container, a balancing beam having a displacement float, a pivotal support for said beam means independent thereof to removably mount said support in said container, a scale on said support and an index on said beam.

12. A portable specific gravity balance for gases, comprising, a gas container, a balancing beam having a displacement float, a pivot on said beam, a support removably mounted in said container, a bearing for said pivot on said support, and a holder on said support adapted to clamp said beam clear of said bearing.

In testimony whereof I affix my signature this 10 day of February 1926.

HOMER ROLAND PIERCE.